United States Patent [19]

Selcukoglu

[11] Patent Number: 4,704,877

[45] Date of Patent: Nov. 10, 1987

[54] APPARATUS AND METHOD OF FREEZING A FEED LIQUID

[75] Inventor: Yuksel A. Selcukoglu, Naperville, Ill.

[73] Assignee: CBI Industries, Inc., Oak Brook, Ill.

[21] Appl. No.: 914,278

[22] Filed: Oct. 2, 1986

[51] Int. Cl.[4] .......................... B01D 9/04; C02F 1/22
[52] U.S. Cl. ...................................... 62/532; 62/123; 165/141; 165/142
[58] Field of Search .................. 62/123, 532; 165/141, 165/142

[56] References Cited

U.S. PATENT DOCUMENTS

| | | | |
|---|---|---|---|
| 4,286,436 | 9/1981 | Engdahl et al. | 62/123 |
| 4,296,612 | 10/1981 | Allo | 62/532 |
| 4,335,581 | 6/1982 | Nail | 62/123 |
| 4,452,302 | 6/1984 | Schoerner | 62/123 |
| 4,541,248 | 9/1985 | Andrepont et al. | 62/123 |
| 4,567,942 | 2/1986 | Stafford et al. | 62/123 |

Primary Examiner—Ronald C. Capossela
Attorney, Agent, or Firm—Marshall, O'Toole, Gerstein, Murray & Bicknell

[57] ABSTRACT

A feed liquid, which can be aqueous, is frozen in tubes of a freeze exchanger by indirect cooling with a cold liquefied refrigerant to form a solid tubular shaped product. A warm liquefied refrigerant is used to indirectly melt a thin layer of the frozen tubular product to release it from the tubes. The freed tubular product is cut into pieces which can be used for cooling purposes and, in the case of ice, to give potable water.

22 Claims, 3 Drawing Figures

APPARATUS AND METHOD OF FREEZING A FEED LIQUID

This invention relates to apparatus for, and methods of, freezing a feed liquid to produce a solid which is then separated from the feed liquid. More particularly, this invention is concerned with freezing a feed liquid in a falling film shell and tube freeze exchanger to produce a tubular shaped solid, with a falling film of cold liquefied refrigerant used on the tube exterior to freeze the liquid and a falling film of warm liquefied refrigerant used on the tube exterior to release or free the tubular solid.

BACKGROUND OF THE INVENTION

Falling film heat exchangers usually include an array of vertical tubes. The tubes can be exposed or surrounded by a shell. The process liquid can be either inside or outside the tube with the heat exchange fluid on the other side.

Although falling film heat exchangers are used to heat a liquid feed stream, they can also be used for cooling such a stream. Falling film heat exchangers of the described types can be used as freeze exchangers for producing fresh water from brackish water and seawater, for concentrating fruit and vegetable juices, and industrial crystallization processes. See U.S. Pat. No. 4,286,436. As the liquid flows through each tube, it can be cooled enough to crystallize a solid from the liquid. Thus, by cooling seawater, ice is obtained which when separated, washed and melted provides potable water. When a fruit or vegetable juice is similarly chilled, ice forms and is removed to provide a concentrated juice.

Freeze exchangers of the described type often use as the cooling fluid a refrigerant such as ammonia, a Freon brand refrigerant, butane or propane.

For a substantial number of years, falling film shell and tube freezers which chill water and freeze it on the inside walls of the tubes by evaporation of a liquefied refrigerant in the shell have been commercially available. The product, often called tube or core ice, is used in restaurants, hotels and industries which need a continuous supply of ice. After a sufficient amount of ice is formed in the tubes, the liquefied refrigerant is drained from the shell and warm gases are admitted, causing the ice to melt on the surface adhering to the tube. The tube ice then slides out of the tube to a cutter which cuts it to desired length.

The efficiency of the described system of making tube ice, whether for ice-making itself or for concentrating aqueous liquids, is limited by flooding the shell with liquefied refrigerant because the liquefied refrigerant must be removed before the warm gas is introduced into the shell to melt and free the ice. Removing the refrigerant liquid and returning it later to repeat the ice forming step consumes power, increases the cost and slows ice production. It also inherently requires a large amount of refrigerant which is a costly component for very large systems. Additionally, using a warm gas to melt the ice surface is inherently inefficient since heat exchange between a gas and a solid is much lower than between a liquid and a solid.

SUMMARY OF THE INVENTION

According to the invention, apparatus is provided for freezing a liquid comprising a refrigeration apparatus means in which a refrigerant, which is a gas at standard temperature and pressure, is liquefied and stored in a first receiver as a warm liquefied refrigerant and in a second receiver as a cold liquefied refrigerant; a freeze exchanger having a shell connected to vertically spaced apart horizontally arranged upper and lower tube sheets; a vertically positioned tube extending through and sealingly connected to a hole in each tube sheet; and a liquid distribution means positioned above the upper tube sheet and means to deliver a feed liquid to the liquid distribution means from which the liquid can flow downward in the tube and be frozen in and on the tube; conduit means to feed cold liquefied refrigerant from the second receiver so that the cold liquefied refrigerant can flow down the exterior surface of the tube as a falling film to thereby cool a feed liquid flowing from the feed liquid distribution means into the tube and produce an adhering core of frozen feed liquid in the tube; means to withdraw refrigerant liquid and vapor from the shell side of the freeze exchanger and return it to the refrigeration apparatus means; means to stop flow of feed liquid to the feed liquid distribution means when freezing of feed liquid in the tube is to be interrupted; conduit means to feed warm liquefied refrigerant from the first receiver so that the warm liquefied refrigerant can flow down the exterior surface of the tube as a falling film to thereby melt a thin layer of a tubular shaped solid product of frozen feed liquid formed adjacent the internal surface of the tube and thereby free the solid product from the tube so that the solid product can slide down and out the end of the tube; means to discontinue feeding warm liquefied refrigerant from the first receiver when the solid product is removed from the tube; means to reinstitute feeding cold liquefied refrigerant from the second receiver after the solid product is removed from the tube; and means to reinstitute delivering feed liquid to the feed liquid distribution means when cold liquefied refrigerant is supplied to the exterior of the tube as a falling film.

It is desirable for some purposes to adapt the apparatus so as to produce a substantially subcooled frozen product or solid from a liquid feed by using a liquefied refrigerant sufficiently cold to produce the desired subcooling.

By using a falling film of cold liquefied refrigerant to freeze the feed liquid, and a falling film of warm liquefied refrigerant to release the solid tubular product of frozen feed liquid, excellent heat exchange is achieved with a minimum volume of refrigerant. It also permits operation of the system with little, if any, accumulation of surplus liquefied refrigerant in the bottom of the freeze exchanger which in due course requires removal.

In normal operation of a refrigeration apparatus, it is conventional to first produce warm liquefied refrigerant and then cold liquefied refrigerant. The cold liquefied refrigerant is obtained simply by expanding the warm liquefied refrigerant. No outside source of heat is accordingly needed in using the apparatus, especially in releasing the solid tubular product of frozen feed liquid.

The apparatus desirably includes a collection vessel for receiving excess cold feed liquid which exits the freeze exchanger tube and conduit means for delivering or returning the feed liquid from the collection vessel to the liquid feed distribution means.

Generally, also included is a cutter means for receiving and cutting the tubular solid removed from the tube into pieces of a desired size, a hopper means for receiving the resulting pieces, and means for transporting the pieces from the cutter to the hopper.

The warm liquefied refrigerant receiver desirably stores the refrigerant at a temperature above the freezing point of the feed liquid, and the cold liquefied refrigerant receiver stores the refrigerant at a temperature below the freezing point of the feed liquid.

The invention also provides a method of freezing a liquid which comprises producing a falling film of a cold liquefied refrigerant, at a temperature below the freezing point of a feed liquid, on the exterior surface of a vertical tube extending through a chamber as the feed liquid flows downwardly in the tube to cool the feed liquid by heat exchange with the cold liquid refrigerant to a temperature low enough to form a tubular solid of frozen feed liquid adhering to the tube; collecting refrigerant vapor in the chamber, sending it to a refrigeration means and recycling it into cold liquefied refrigerant for reuse in the freezing of feed liquid; collecting refrigerant liquid in the chamber and recirculating it to the top of the chamber; discontinuing flow of feed liquid to the tube interior; discontinuing flow of cold liquefied refrigerant on the exterior surface of the tube; producing a falling film of a warm liquefied refrigerant, having a temperature above the freezing point of the feed liquid, on the exterior surface of the tube thereby melting a thin layer of the tubular solid product of frozen feed liquid adjacent the tube internal surface and freeing the tubular solid from the tube so the tubular solid can slide down and out the end of the tube; discontinuing feeding warm liquefied refrigerant on the exterior surface of the tube after the tubular solid is removed from the tube; collecting warm refrigerant vapor in the chamber, sending it to a refrigeration means and recycling it into warm liquefied refrigerant for reuse in the said process; collecting warm liquefied refrigerant in the chamber for reuse in the method; reinstituting producing a falling film of a cold liquefied refrigerant on the exterior surface of the tube as feed liquid flows downwardly in the tube to again form a tubular solid of frozen feed liquid adhering in the tube; and continuing to repeat the process as described.

The feed liquid can be an aqueous liquid, such as a fruit juice, vegetable juice, coffee extract, tea extract, alcoholic beverage, brackish water, salt water or potable water. However, the method can be used with nonaqueous liquids in separation and concentration operations.

The refrigerant can be a single or multiple component product suitably used in a closed refrigeration cycle. Freon brand refrigerants, ammonia, propane and butane are suitable refrigerants which can be used.

DETAILED DESCRIPTION OF THE DRAWINGS

Figure 1:
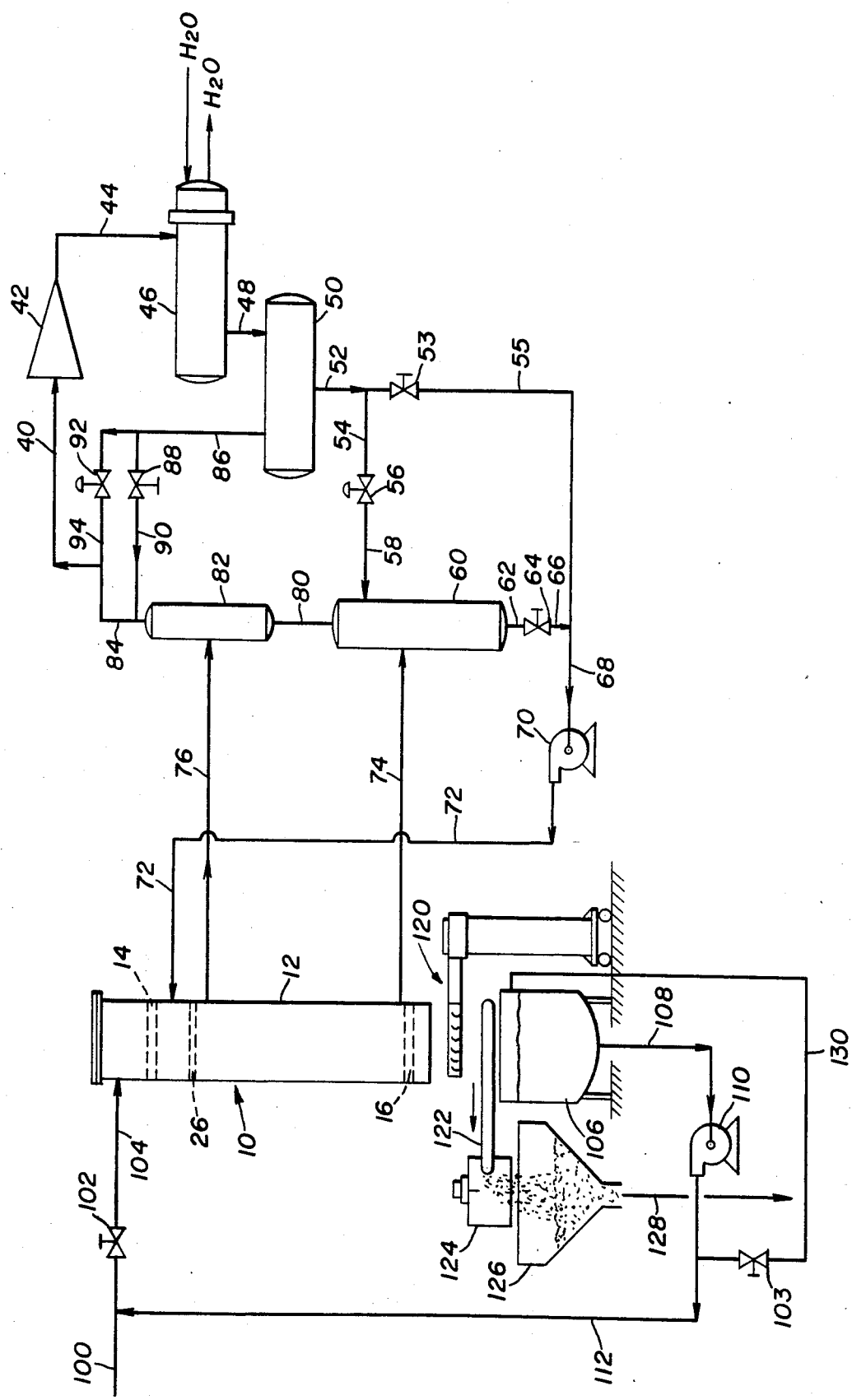
FIG. 1 is a diagrammatic drawing illustrating broadly a combination of apparatus provided by the invention for freezing a feed liquid into a tubular solid.

To the extent it is reasonable and practical, the same or similar elements or parts which appear in the various views of the drawings will be identified by the same numbers.

With reference to the drawings, the falling film heat exchanger 10 has a circular cylindrical shell 12 connected to vertically spaced apart horizontally arranged upper circular tube sheet 14 and lower circular tube sheet 16. A plurality of vertically positioned parallel tubes 18 extend through and are sealingly connected to each tube sheet. A portion 20 of shell 12 extends above upper tube sheet 14. Removable cover 22 is mounted on the top of shell portion 20. The sheet portion 20, cover 22 and upper tube sheet 14 define a liquid distribution box to which a liquid to be frozen can be supplied through port or opening 24.

Circular distribution plate 26 is spaced below upper tube sheet 14 and is sealingly connected to the shell 12, thereby forming a liquefied refrigerant distribution space 28 between the distribution plate 26, upper tube sheet 14 and shell 12. The distribution plate 26 contains a plurality of oversized walled circular holes 30 through each of which a tube 18 extends.

Figure 2:
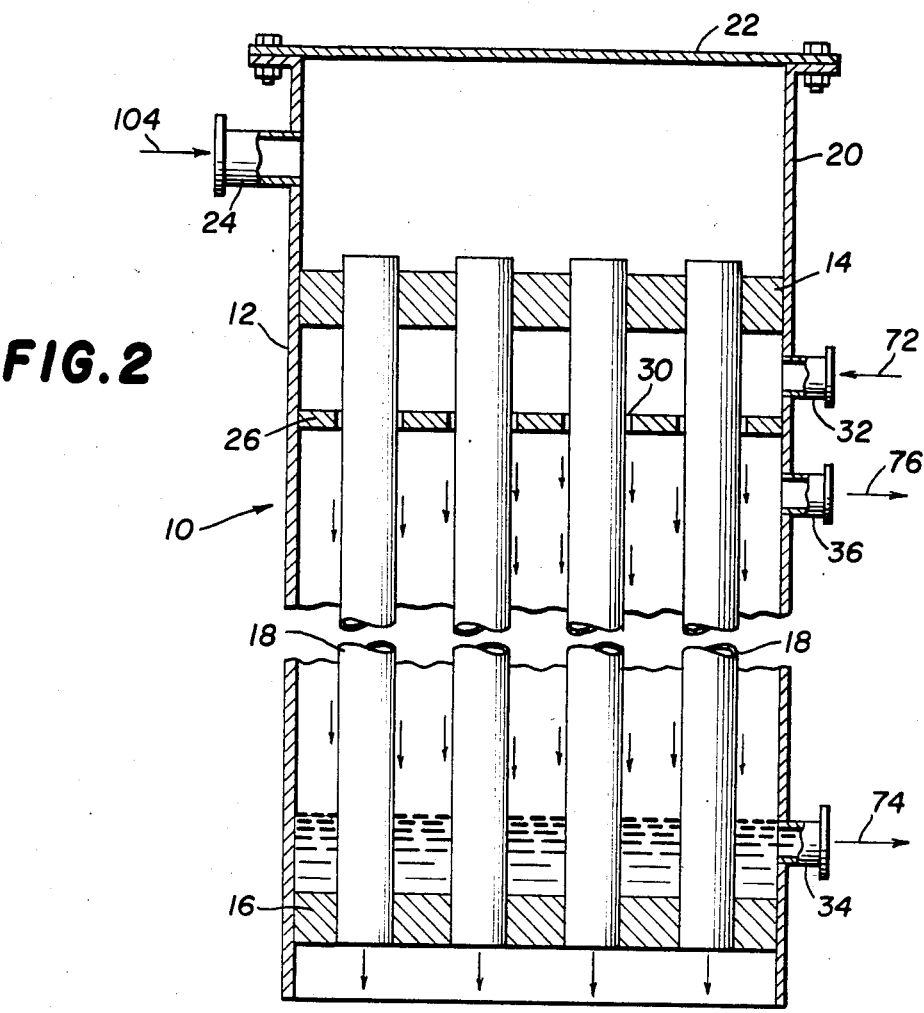
FIG. 2 is a vertical sectional view of a falling film shell and tube freeze exchanger which can be used in the invention.
Figure 3:
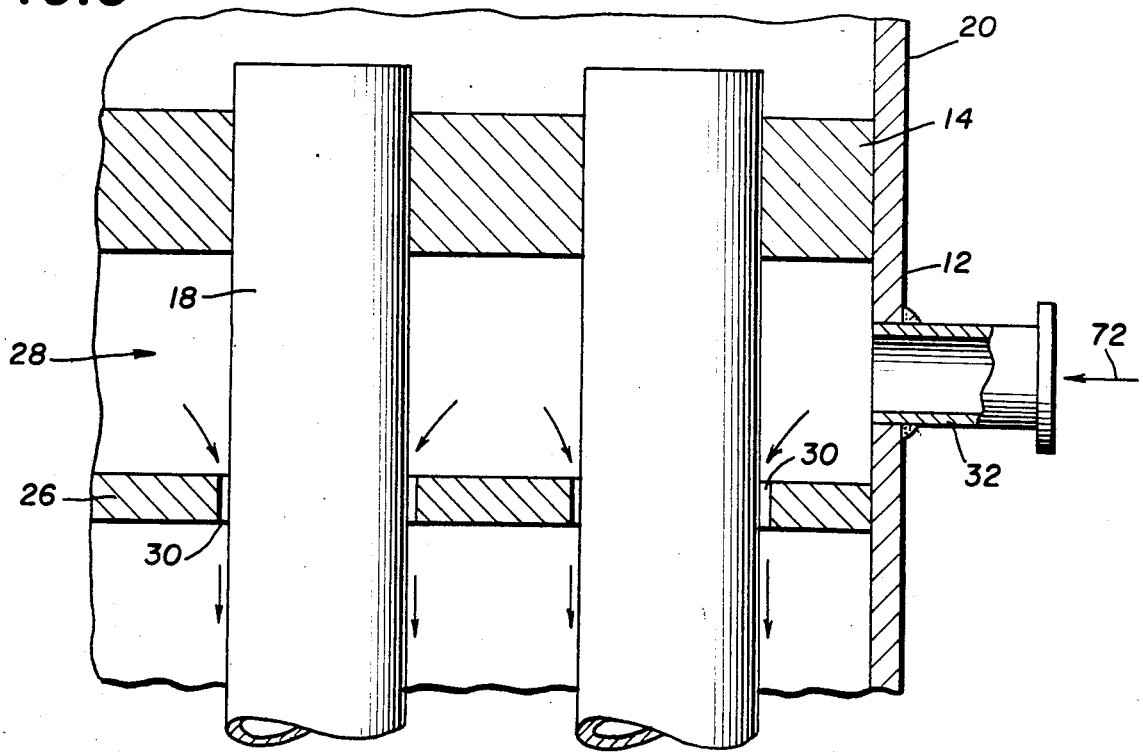
FIG. 3 is an enlarged sectional view of a portion of the freeze exchanger shown in FIG. 2.

Liquid inlet port 32 in shell 12 provides means for feeding liquefied refrigerant into the distribution space 28. Furthermore, the ports 34 and 36 communicate with the shell side of the heat exchanger space between distribution plate 26 and lower tube sheet 16. Refrigerant vapor is removed from the upper portion of that space through port 36 and the unvaporized portion of the refrigerant is removed from the lower portion of that space through port 34 as shown in FIG. 2.

Each oversized circular hole 30 in distribution plate 26, and the adjacent circular cylindrical surface of tube 18 extending through the hole, defines an annular opening or space 36 through which liquefied refrigerant can flow from distribution space 28 downwardly on the tube exterior surface as a thin falling film.

The described apparatus is particularly useful as a freeze exchanger in which a liquid is cooled and frozen in the tubes by heat exchange with a cold falling film of liquefied refrigerant on the shell side. However, Burdick U.S. Pat. No. 1,694,370 discloses a related shell and tube heat exchanger which might also be used.

The liquefied refrigerant used to freeze a feed liquid in the freeze exchanger 10 is produced by a refrigeration apparatus which uses a refrigerant, normally a gas, at standard temperature and pressure. Ammonia or a Freon brand refrigerant is desirably employed.

A refrigerant vapor is supplied by conduit 40 to compressor 42 from which the compressed vapor is fed by conduit 44 to water cooled refrigerant condenser 46. The warm liquefied refrigerant is fed by conduit 48 to warm liquefied refrigerant receiver 50.

Warm liquefied refrigerant is withdrawn from receiver 50 and fed by conduits 52,54 to Joule-Thomson expansion valve 56. A mixture of refrigerant vapor and cold liquefied refrigerant exits valve 56 into conduit 58 which feeds it to cold liquefied refrigerant receiver 60. The vapor flows from receiver 60 through conduit 80 to vapor separator 82. Conduit 84 conveys vapor from separator 82 to conduit 40 to return it to compressor 42.

A feed liquid, which can be water or an aqueous liquid when ice is to be produced in tubes 18, is fed by conduit 100 through control valve 102 to conduit 104 which delivers it to port or opening 24. The feed liquid flows down the tubes 18 as a falling film on the inside surface of the tubes. As the feed liquid flows through the tubes 18, cold liquefied refrigerant is removed from receiver 60 by conduit 62 and fed through valve 64 to conduit 66 which feeds it to conduit 68. At this time valve 53 is closed conduit 68 delivers the cold liquefied refrigerant to liquid pump 70 from which the cold liquefied refrigerant is fed to conduit 72 which delivers it to port 32. The cold liquefied refrigerant flows through holes 30 and down the outside surface of each tube 18 as a falling film. The feed liquid in the tubes is cooled by heat exchange to the refrigerant, thereby causing the feed liquid to freeze on the internal surfaces of the tubes and form a solid layer of ice on the inside surface of the tubes. Excess cold liquefied refrigerant which accumulates in the lower part of shell 12 is withdrawn through outlet port 34 which communicates with conduit 74. Conduit 74 returns the refrigerant to receiver 60. Cold refrigerant vapor is removed from shell 12 through port 36 and fed to vapor separator 82. Warm vapor is removed from the receiver 50 by conduit 86 and fed through valve 88 to conduit 90 which feeds it to conduit 84. Conduit 90 equalizes the pressure in freeze exchanger 10 and receiver 50 before commencing the defrost cycle. The warm vapors from conduit 76 and the cold vapors from conduit 90 mix in conduit 84 as the vapors flow to the compressor 42. It is to be understood that the warm refrigerant is a product of the refrigeration cycle.

The amount of feed liquid which flows through tubes 18 is controlled to be in excess of the amount which is frozen in the tubes. Excess feed liquid flowing out the lower ends of tubes 18 is collected in vessel 106. The feed liquid is removed from vessel 106 through conduit 108 and delivered to pump 110. Conduit 112 receives the feed liquid from pump 110 and delivers it to conduit 100 to be mixed with incoming prechilled feed liquid to further cool the feed liquid thus bringing it very close to its freezing point temperature before it is fed to freeze exchanger 10.

After sufficient frozen solid, such as ice, is formed in tubes 18, valve 102 is closed, pump 70 is stopped, and valves 56,64 are closed. Valve 103 is opened and with pump 110 continuing to run the liquid is fed from conduit 112 to conduit 130 and recycled to the top of vessel 106. Valve 88 is opened to allow the pressure on the shell side of the exchanger to build up to a level equal to or just below the pressure in receiver 50. Valve 53 is opened and warm liquefied refrigerant is withdrawn from receiver 50 by conduit 52, fed through valve 53 and delivered to conduit 55 which feeds it to conduit 68. Conduit 68 feeds the warm liquefied refrigerant to pump 70 which delivers it to conduit 72 which feeds it to port 32. The warm liquefied refrigerant flows through holes 30 down the outside of tubes 18 as a falling film. By heat exchange with the warm liquefied refrigerant an extremely thin film of liquid forms along the inside surface of each tube by melting a thin layer of the frozen solid therein. This causes the adhering frozen solid to be released from the inside surfaces of the tubes. The tubes of frozen solid slide by gravity out the lower ends of the tubes and into contact with a mobile cutter 120. The cut solid pieces fall onto conveyor belt 122 which feeds it to crusher 124. The crushed frozen solid falls into hopper 126 from which it is fed by conduit 128 to a suitable destination.

Flow of warm liquefied refrigerant along the outside of the tubes is continued only until the frozen tubular solid product is removed from the tubes 18. Any excess liquefied refrigerant is removed from the shell side of the freezer exchanger by conduit 74. Refrigerant vapor is withdrawn from the shell side by conduit 76 which feeds it to separator 82. The vapor flows from separator 82 to conduit 84. It is mixed therein with cold refrigerant vapor formed by removing warm vapor from receiver 50 by conduit 86 and, with valve 88 closed, expanding it through Joule-Thomson valve 92 and feeding it to conduit 94 at a cold temperature. Conduit 94 functions as a capacity control hot gas by-pass means. The vapors mixed in conduit 84 are fed to conduit 40 which feeds them to compressor 42.

After the frozen solid is removed from tubes 18, valve 53 is closed. Feed liquid valve 102 is opened and pump recycle valve 103 is closed. Valves 56 and 64 are opened and pump 70 is started. The system is then operated in the manner described above to produce another batch of frozen solid in the tubes. After the batch is formed, it is removed as already described.

It should be understood from the above description that the cold liquefied refrigerant is at a temperature below the freezing temperature of the feed liquid in the tubes. Additionally, the warm liquefied refrigerant can be at a temperature above the freezing temperature of the feed liquid.

When water is the liquid feed and it is frozen as described, the ice is obtained in a dry form which requires no dewatering. This makes it easy to handle.

After the frozen solid tubular product is formed in tubes 18, it may be desirable to continue operating the system in the freezing mode to subcool the frozen solid and thus store additional refrigeration in the solid. This could be advantageous if the frozen solid is ice to be used in an air conditioning system.

The described system is highly efficient in both the freezing mode and in the defrosting or melting mode since each utilizes a double falling film. Loosening of the frozen tubular product occurs very uniformly and quickly with minimal melting loss. The absence of a significant liquefied refrigerant head on the shell side, in both the freezing and defrosting modes, simplifies the operation and significantly reduces the time necessary to shift from freezing mode to defrosting mode and back to freezing mode since very little, if any, liquefied refrigerant need be removed before changing from one mode to the other mode. In the case of aqueous feed streams, if pure water is not used, some desalination or purification will be effected. Very important also is the fact that no external heat need be used to effect the melting. The warm liquefied refrigerant is produced routinely in a refrigeration cycle as a result of the compression applied to the vapor by the compressor and subsequent condensation of the compressed vapor against air or water.

With ammonia or R-22 used as the refrigerant, the following conditions are representative of those which can exist in the key areas of the apparatus illustrated in FIG. 1:

| FIG. 1 Item Number | NH$_3$ | | R-22[1] | |
|---|---|---|---|---|
| | Pressure psia | Temp °F. | Pressure psia | Temp °F. |
| 10 | 59.4 | 26 | 64.9 | 26 |
| 50 | 107.6 | 60 | 117.2 | 60 |
| 60 | 59.4 | 26 | 64.9 | 26 |

[1] chlorodifluoromethane

The foregoing detailed description has been given for clearness of understanding only, and no unnecessary limitations should be understood therefrom, as modifications will be obvious to those skilled in the art.

What is claimed is:

1. Apparatus for freezing a liquid comprising:
   a refrigeration apparatus means in which a refrigerant, which is a gas at standard temperature and pressure, is liquefied and stored in a first receiver as a warm liquefied refrigerant and in a second receiver as a cold liquefied refrigerant;
   a freeze exchanger having a shell connected to vertically spaced apart horizontally arranged upper and lower tube sheets; a vertically positioned tube extending through and sealingly connected to a hole in each tube sheet; and a liquid distribution means positioned above the upper tube sheet and means to deliver a feed liquid to the liquid distribution means from which the liquid can flow downward in the tube and be frozen on the inner surface of the tube;
   conduit means to feed cold liquefied refrigerant from the second receiver so that the cold liquefied refrigerant can flow down the exterior surface of the tube as a falling film to thereby cool a feed liquid flowing from the feed liquid distribution means into the tube and produce adhering solid tubular shaped product of frozen feed liquid in the tube;
   means to withdraw refrigerant liquid and vapor from the shell side of the freeze exchanger and return it to the refrigeration apparatus means;
   means to stop flow of feed liquid to the feed liquid distribution means when freezing of feed liquid in the tube is to be interrupted;
   conduit means to feed warm liquefied refrigerant from the first receiver so that the warm liquefied refrigerant can flow down the exterior surface of the tube as a falling film to thereby melt a thin layer of the solid tubular shaped product of frozen feed liquid adjacent the internal surface of the tube and thereby free the solid tubular shaped product from the tube so that the solid tubular shaped product can slide down and out the end of the tube;
   means to discontinue feeding warm liquefied refrigerant from the first receiver when the frozen tubular product is removed from the tube;
   means to reinstitute feeding cold liquefied refrigerant from the second receiver after the solid tubular shaped product is removed from the tube; and
   means to reinstitute delivering feed liquid to the feed liquid distribution means when cold liquefied refrigerant is supplied to the exterior of the tube as a falling film.

2. Apparatus according to claim 1 including a collection vessel for receiving cold feed liquid which exits the freeze exchanger tube and conduit means for delivering feed liquid from the collection vessel to the liquid feed distribution means.

3. Apparatus according to claim 1 including cutter means for receiving and cutting the tubular shaped frozen product removed from the tube into pieces, a hopper means for receiving the resulting pieces, and means for transporting the pieces from the cutter to the hopper.

4. Apparatus according to claim 1 in which the warm liquefied refrigerant receiver can store the refrigerant at a temperature above the freezing point of the feed liquid and the cold liquefied refrigerant receiver can store the refrigerant at a temperature below the freezing point of the feed liquid.

5. Apparatus for freezing a liquid comprising:
   a refrigeration apparatus means in which a refrigerant, which is a gas at standard temperature and pressure, is liquefied and stored in a first receiver as a warm liquefied refrigerant and in a second receiver as a cold liquefied refrigerant;
   a freeze exchanger having a shell connected to vertically spaced apart horizontally arranged upper and lower tube sheets; a plurality of vertically positioned parallel tubes, with each tube extending through and sealingly connected to a hole in each tube sheet; a distribution plate spaced below the upper tube sheet and sealingly connected to the shell thereby forming a liquefied refrigerant distribution space between the distribution plate and upper tube sheet, with said parallel tubes extending through holes in the distribution plate; and a liquid distribution box positioned above the upper tube sheet and means to deliver a feed liquid to the liquid distribution box from which the liquid can flow downward in the tubes and be frozen in and on the tubes;
   conduit means to feed cold liquefied refrigerant from the second receiver to the distribution space so that the cold liquefied refrigerant can flow down the exterior surface of the tubes as a falling film to thereby cool a feed liquid flowing from the distribution box into the tubes and produce an adhering solid tubular shaped product of frozen feed liquid in each tube;
   means to withdraw refrigerant liquid and vapor from the shell side of the freeze exchanger and return it to the refrigeration apparatus means;
   means to stop flow of feed liquid to the distribution box when freezing of feed liquid in the tubes is to be interrupted;
   conduit means to feed warm liquefied refrigerant from the first receiver to the distribution space so that the warm liquefied refrigerant can flow down the exterior surface of the tubes as a falling film to thereby melt a thin layer of the tubular shaped product of frozen feed liquid adjacent the internal surface of each tube and thereby free the tubular product from the tube so that the tubular product can slide down and out the end of the tube;
   means to discontinue feeding warm liquefied refrigerant from the first receiver to the distribution space when the tubular product is removed from the tubes;
   means to reinstitute feeding cold liquefied refrigerant from the second receiver to the distribution space after the tubular product is removed from the tubes; and
   means to reinstitute delivering feed liquid to the distribution box when cold liquefied refrigerant is supplied to the distribution space.

6. Apparatus according to claim 5 adapted to produce a substantially subcooled frozen product or solid from the feed liquid.

7. Apparatus according to claim 5 including a collection vessel for receiving cold feed liquid which exists the freeze exchanger tubes and conduit means for delivering feed liquid from the collection vessel to the liquid feed distribution box.

8. Apparatus according to claim 5 including cutter means for receiving and cutting the tubular products removed from the tubes into pieces, a hopper means for receiving the resulting pieces, and means for transporting the cut pieces from the cutter to the hopper.

9. Apparatus according to claim 5 in which the warm liquefied refrigerant receiver can store the refrigerant at a temperature above the freezing point of the feed liquid and the cold liquefied refrigerant receiver can store the refrigerant at a temperature below the freezing point of the feed liquid.

10. A method of freezing a liquid which comprises:

producing a falling film of a cold liquefied refrigerant, at a temperature below the freezing point of a feed liquid, on the exterior surface of a vertical tube extending through a chamber as the feed liquid flows downwardly in the tube to cool the feed liquid by heat exchange with the cold liquid refrigerant to a temperature low enough to form a solid tubular shaped product of frozen feed liquid adhering to the tube;

collecting refrigerant vapor and liquid in the chamber, sending it to a refrigeration means and recycling it into cold liquefied refrigerant for reuse in the freezing of feed liquid;

collecting refrigerant liquid in the chamber and recirculating it to the top of the chamber;

discontinuing flow of feed liquid to the tube interior;

discontinuing flow of cold liquefied refrigerant on the exterior surface of the tube;

producing a falling film of a warm liquefied refrigerant, having a temperature above the freezing point of the feed liquid, on the exterior surface of the tube to thereby melt the solid tubular product of frozen feed liquid adjacent the tube internal surface and thereby free the solid tubular product from the tube so the solid tubular shaped product can slide down and out the end of the tube;

discontinuing feeding warm liquefied refrigerant on the exterior surface of the tube after the solid tubular shaped product is removed from the tube;

collecting warm liquefied refrigerant vapor and liquid in the chamber, sending it to a refrigeration means and recycling it into warm liquefied refrigerant for reuse in the said process;

collecting warm liquefied refrigerant in the chamber for reuse in the method;

reinstituting producing a falling film of a cold liquefied refrigerant on the exterior surface of the tube as feed liquid flows downwardly in the tube to again form a solid tubular shaped product of frozen feed liquid adhering to the tube; and continuing to repeat the process as described.

11. A method according to claim 10 in which the feed liquid is an aqueous liquid.

12. A method according to claim 11 in which the aqueous liquid is a fruit juice, vegetable juice, coffee extract, tea extract, alcoholic beverage, brackish water, salt water or potable water.

13. A method according to claim 10 in which the warm and cold refrigerants have essentially the same gaseous composition.

14. A method according to claim 10 in which excess feed liquid is fed to the tube and the excess feed liquid not frozen and deposited in the tube is recycled to flow down the tube again.

15. A method according to claim 10 in which the feed liquid is water and the resulting tubular ice product is cut into pieces.

16. A method according to claim 10 in which the liquefied refrigerant used to freeze the feed liquid is cold enough to produce a substantially subcooled frozen product from feed liquid in the tubes.

17. A method of freezing a liquid which comprises:

delivering a feed liquid to the distribution box of a freeze exchanger;

said freeze exchanger having a shell connected to vertically spaced apart horizontally arranged upper and lower tube sheets; a plurality of vertically positioned parallel tubes, with each tube extending through and sealingly connected to a hole in each tube sheet; a distribution plate spaced below the upper tube sheet and sealingly connected to the shell thereby forming a liquefied refrigerant distribution space between the distribution plate and the upper tube sheet, with said parallel tubes extending through the distribution plate; and a liquid distribution box positioned above the upper tube sheet;

permitting the feed liquid in the distribution box to flow downward in the tubes and be frozen in and on the tubes;

operating a refrigeration apparatus means so that a refrigerant, which is a gas at standard temperature and pressure, is liquefied and stored in a first receiver as a warm liquefied refrigerant and in a second receiver as a cold liquefied refrigerant;

feeding cold liquefied refrigerant, at a temperature below the freezing point of the feed liquid, from the second receiver to the distribution space so that the cold liquefied refrigerant can flow down the exterior surface of the tubes as a falling film to thereby cool the feed liquid flowing from the distribution box into the tubes and produce an adhering solid tubular shaped product of frozen feed liquid in each tube;

collecting refrigerant vapor and liquid from the shell side of the freeze exchanger, sending it to the refrigeration means and recycling it into cold liquefied refrigerant for reuse in the freezing of feed liquid;

discontinuing flow of feed liquid to the distribution box;

discontinuing flow of cold liquefied refrigerant to the distribution space;

withdrawing refrigerant liquid and vapor from the shell side of the freeze exchanger and returning it to the refrigeration cycle;

feeding warm liquefied refrigerant, at a temperature above the freezing point of the feed liquid, from the first receiver to the distribution space so that the warm liquefied refrigerant can flow down the exterior surface of the tubes as a falling film to thereby melt the surface of the solid tubular shaped product of frozen feed liquid adjacent the internal surface of each tube and thereby free the tubular product from the tubes so that the tubular product slides down and out the end of the tubes;

discontinuing feeding warm liquefied refrigerant from the first receiver to the distribution space when the frozen tubular products are removed from the tubes;

collecting warm liquefied refrigerant vapor and liquid from the shell side of the freeze exchanger, sending it to the refrigeration apparatus means and recycling it into warm liquefied refrigerant for reuse in the said process;

reinstituting feeding cold liquefied refrigerant from the second receiver to the distribution space after the frozen tubular shaped products are removed from the tubes; and reinstituting delivering feed liquid to the distribution box when cold liquefied refrigerant is supplied to the distribution space.

18. A method according to claim 17 in which the feed liquid is an aqueous liquid.

19. A method according to claim 18 in which the aqueous liquid is a fruit juice, vegetable juice, coffee extract, tea extract, alcoholic beverage, brackish water, salt water or potable water.

20. A method according to claim 17 in which the warm and cold refrigerants have essentially the same gaseous composition.

21. A method according to claim 17 in which excess feed liquid is fed to the tubes and the excess feed liquid not frozen and deposited in the tubes is recycled to flow down the tubes again.

22. A method according to claim 17 in which the feed liquid is water and the resulting tubular ice product is cut into pieces.

* * * * *